United States Patent
Bohli et al.

(10) Patent No.: US 10,841,105 B2
(45) Date of Patent: Nov. 17, 2020

(54) METHOD AND SYSTEM FOR PROVIDING A PROOF-OF-WORK

(71) Applicant: NEC Laboratories Europe GmbH, Heidelberg (DE)

(72) Inventors: Jens-Matthias Bohli, Leimen (DE); Ghassan Karame, Heidelberg (DE); Frederik Armknecht, Worms (DE)

(73) Assignee: NEC CORPORATION, Tokyo (JP)

( * ) Notice: Subject to any disclaimer, the term of this patent is extended or adjusted under 35 U.S.C. 154(b) by 204 days.

(21) Appl. No.: 15/737,333

(22) PCT Filed: Aug. 5, 2015

(86) PCT No.: PCT/EP2015/068111
§ 371 (c)(1),
(2) Date: Dec. 18, 2017

(87) PCT Pub. No.: WO2017/020953
PCT Pub. Date: Feb. 9, 2017

(65) Prior Publication Data
US 2018/0183611 A1    Jun. 28, 2018

(51) Int. Cl.
*H04L 9/32* (2006.01)
*H04L 29/06* (2006.01)

(52) U.S. Cl.
CPC ........... *H04L 9/3271* (2013.01); *H04L 63/08* (2013.01); *H04L 63/1458* (2013.01); *H04L 2209/56* (2013.01)

(58) Field of Classification Search
CPC ............... H04L 9/3271; G06F 21/554; G06F 2221/2133; G06F 2221/0788
See application file for complete search history.

(56) References Cited

U.S. PATENT DOCUMENTS 6,456,875 B1 *  9/2002  Wilkinson ........... H03M 13/091
                                                     607/2
7,600,255 B1 * 10/2009  Baugher ............. H04L 63/1458
                                                     726/22
(Continued)

FOREIGN PATENT DOCUMENTS

EP           2608486 A1 *  6/2013  ............. H04L 63/18

OTHER PUBLICATIONS

Ghassan O Karame et al: "Low-Cost Client Puzzles Based on Modular Exponentiation", Sep. 20, 2010 (Sep. 20, 2010), Computer Security—ESORICS 2010, Springer Berlin Heidelberg, Berlin, Heidelberg, pp. 679-697, XP019150439.
(Continued)

*Primary Examiner* — Madhuri R Herzog
(74) *Attorney, Agent, or Firm* — Leydig, Voit & Mayer, Ltd.

(57) ABSTRACT

A method for providing a proof-of-work includes computing, by a verification computing device (VCD), a first linear feedback shift register sequence (LFSR-S) using a first polynomial having a first degree and computing, by the VCD, a second LFSR-S based on a second polynomial. A challenge, generated by the VCD and using elements of the second LFSR-S, is transmitted to the PCD. The PCD recursively computes all elements of the first LFSR-S by using the elements and coefficients of the second LFSR-S. A solution for the received challenge is computed based on the computed elements of the first LFSR-S. A proof-of-work is provided by verifying, by the VCD, the transmitted solution by: recomputing a solution to the challenge using initial state parameters and coefficients of the first LFSR-S, and comparing the computed solution of the PCD with the recomputed solution of the VCD.

15 Claims, 2 Drawing Sheets

(56) References Cited

U.S. PATENT DOCUMENTS

| | | | |
|---|---|---|---|
| 7,673,141 B2* | 3/2010 | Kilian-Kehr | H04L 63/0869 713/168 |
| 8,397,275 B1* | 3/2013 | Magdsick | G06F 21/31 380/200 |
| 8,868,923 B1* | 10/2014 | Hamlet | G06F 21/00 326/8 |
| 2002/0168067 A1* | 11/2002 | Kouzminov | G06F 21/76 380/201 |
| 2007/0047622 A1* | 3/2007 | Stern | G06F 7/58 375/130 |
| 2007/0136647 A1* | 6/2007 | Kanai | G06F 11/1032 714/785 |
| 2010/0031315 A1 | 2/2010 | Feng et al. | |
| 2011/0231913 A1 | 9/2011 | Feng et al. | |
| 2015/0195088 A1* | 7/2015 | Rostami | G09C 1/00 380/28 |

OTHER PUBLICATIONS

Suratose Tritilanunt et al: "QUT Digital Repository: Toward Non-parallelizable Client Puzzles Toward Non-Parallelizable Client Puzzles", CANS Lecture Notes in Computer Science, Oct. 8, 2007 (Oct. 8, 2007), pp. 247-264, XP055262577.

Alfred Menezes et al: "Handbook of Applied Cryptography, Stream Ciphers" In: "Handbook of Applied Cryptography; [CRC Press Series on Discrete Mathematics and Its Applications]", Jan. 1, 1997 (Jan. 1, 1997), CRC Press, XP055091009, pp. 191-222.

* cited by examiner

METHOD AND SYSTEM FOR PROVIDING A PROOF-OF-WORK

CROSS-REFERENCE TO PRIOR APPLICATION

This application is a U.S. National Stage Application under 35 U.S.C. § 371 of International Application No. PCT/EP2015/068111 filed on Aug. 5, 2015. The International Application was published in English on Feb. 9, 2017 as WO 2017/020953 A1 under PCT Article 21(2).

FIELD

The present invention relates to a method for providing a proof-of-work.

The present invention further relates to a system for providing a proof-of-work.

The present invention even further relates to a non-transitory computer readable medium storing a program causing a computer to execute a method for providing a proof-of-work.

BACKGROUND

Proof-of-works are getting more and more important in information technology security. For example crypto currencies like Bitcoin rely on proof-of-works to thwart the overproduction. Client puzzles are tightly coupled with proof-of-work systems in which a client or prover needs to demonstrate to a puzzle generator, i.e. a verifier, that it has expended a certain level of computational effort in a specified interval of time. Client puzzles are applied in several fields, for example as a prevention against denial of service attacks, protection from connection depletion attacks or protection against collusion as disclosed in the non patent literature of D. Dean and A. Stubblefield, Using client puzzles to protect TLS, In Proceedings of the USENIX Security Symposium, 2001 or as disclosed in the non patent literature of G. Karame, S. Capkun, Low-cost puzzles based on Modular Exponentiation, In Proceedings of ESORICS, 2010.

Conventional computational puzzles proposed in recent years have to satisfy several criteria to be useful in practice: Namely they need to be inexpensive to construct and verify and in many applications puzzles should be easy to fine-tune in order to adjust their difficulty. Conventional puzzles as for example disclosed in the non patent literature of S. Tritilanunt, C. Boyd, J. M. Gonzalez Nieto, and E. Foo. Toward NonParallelizable Client Puzzles. In Proceedings of CANS, 2007 have the problem that they are not very easy to fine-tune.

SUMMARY

In an embodiment, the present invention provides a method for providing a proof-of-work. A verification computing device (VCD) computes a first linear feedback shift register sequence (LFSR-S) using a first polynomial having a first degree and also computes a second LFSR-S based on a second polynomial. The polynomials are computed such that the first polynomial divides the second polynomial. Elements generated by a function on input of a number of initial state parameters and corresponding coefficients of the second LFSR-S are transmitted to a proving computing device (PCD). A challenge, generated by the VCD and using the elements of the second LFSR-S, is transmitted to the PCD. The PCD recursively computes all elements of the first LFSR-S by using the transmitted elements and coefficients of the second LFSR-S. A solution for the received challenge is computed based on the computed elements of the first LFSR-S and the solution is transmitted to the VCD. A proof-of-work is provided by verifying, by the VCD, the transmitted solution by: recomputing a solution to the challenge using initial state parameters and coefficients of the first LFSR-S, and comparing the computed solution of the PCD with the recomputed solution of the VCD.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
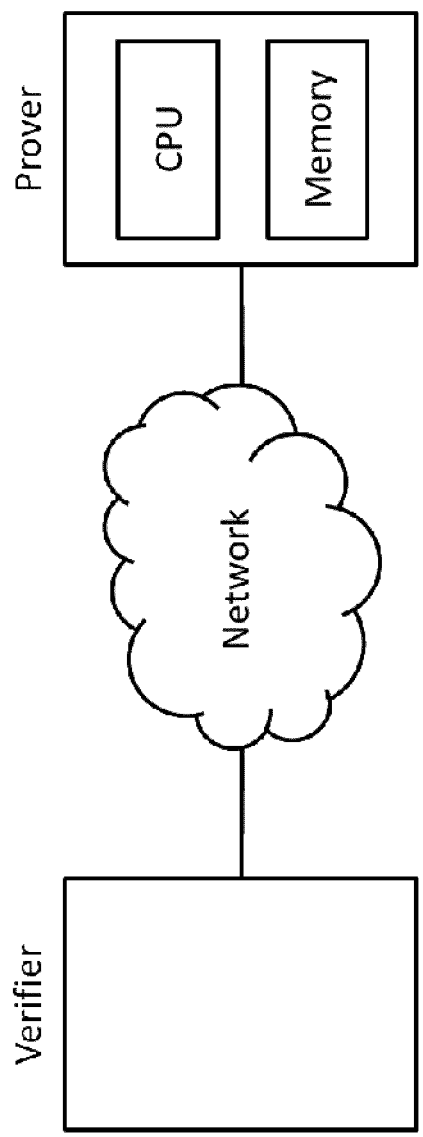
FIG. 1 shows a system according to an embodiment of the present invention.

One of the problems addressed by embodiments of the invention provides a proof-of-work which can be easily adjusted based on requirements.

In an embodiment the present invention provides a method for providing a proof-of-work, comprising the steps of:
a) Computing, by a verification computing device, 'VCD', a first linear feedback shift register sequence, 'LFSR-S', using a first polynomial having a first degree and computing, by said VCD, a second LFSR-S based on a second polynomial, wherein said polynomials are computed such that the first polynomial divides the second polynomial,
b) Transmitting elements generated by a function on input of a number of initial state parameters of said second LFSR-S to a proving computing device, 'PCD',
c) Transmitting a challenge, generated by said VCD and using said elements of said second LFSR-S, to said PCD,
d) Recursively computing, by said PCD, all elements of said first LFSR-S by using said transmitted elements of said second LFSR-S,
e) Computing a solution for said received challenge based on said computed elements of said first LFSR-S and transmitting said solution to said VCD
f) Providing a proof-of-work by verifying, by said VCD, said transmitted solution by
  recomputing a solution to said challenge using initial state parameters and coefficients of said first LFSR-S
  comparing the computed solution of said PCD with said recomputed solution of said VCD.

In a further embodiment the present invention provides a system for providing a proof-of-work, comprising a by a verification computing device, 'VCD' and a proving computing device, 'PCD', said VCD being adapted to:
compute a first linear feedback shift register sequence, 'LFSR-S', using a first polynomial having a first degree and computing, by said VCD, a second LFSR-S based on a second polynomial, wherein said polynomials are computed such that the first polynomial divides the second polynomial, transmit elements generated by a function on input of a number of initial state parameters of said second LFSR-S to a proving computing device, 'PCD', transmit a challenge, generated by said VCD and using said elements of said second LFSR-S, to said PCD, and provide a proof-of-work by verifying, a transmitted solution by recomputing a solution to said challenge using initial state parameters and coefficients of said first LFSR-S comparing a computed solution of said PCD with said recomputed solution of said VCD and wherein said PCD being adapted to:

recursively compute all elements of said first LFSR-S by using said transmitted elements of said second LFSR-S, and compute a solution for said received challenge based on said computed elements of said first LFSR-S and transmitting said solution to said VCD.

In a further embodiment the present invention provides a non-transitory computer readable medium storing a program causing a computer to execute a method for providing a proof-of-work, said method comprising:
a) Computing a first linear feedback shift register sequence, 'LFSR-S', using a first polynomial having a first degree and computing a second LFSR-S based on a second polynomial, wherein said polynomials are computed such that the first polynomial divides the second polynomial,
b) Providing elements generated by a function on input of a number of initial state parameters of said second LFSR-S
c) Providing a challenge using said elements of said second LFSR-S,
d) Recursively computing all elements of said first LFSR-S by using said provided elements of said second LFSR-S,
e) Computing a solution for said received challenge based on said computed elements of said first LFSR-S
f) Providing a proof-of-work by verifying said solution by
recomputing a solution to said challenge using initial state parameters and coefficients of said first LFSR-S
comparing the computed solution of said PCD with said recomputed solution of said VCD.

In a further embodiment the present invention provides a computing device, 'VCD', being adapted to:

compute a first linear feedback shift register sequence, 'LFSR-S', using a first polynomial having a first degree and computing, a second LFSR-S based on a second polynomial, wherein said polynomials are computed such that the first polynomial divides the second polynomial, transmit elements generated by a function on input of a number of initial state parameters and corresponding coefficients of said second LFSR-S to a proving computing device, 'PCD', transmit a challenge, generated by said VCD and using said elements of said second LFSR-S, to said PCD, and provide a proof-of-work by verifying, a transmitted solution by recomputing a solution to said challenge using initial state parameters and coefficients of said first LFSR-S, comparing a computed solution of said PCD with said recomputed solution of said VCD.

In a further embodiment the present invention provides a method, performed by a computing device, 'VCD', comprising:
A1) Computing a first linear feedback shift register sequence, 'LFSR-S', using a first polynomial having a first degree and computing a second LFSR-S based on a second polynomial, wherein said polynomials are computed such that the first polynomial divides the second polynomial,
B1) Providing elements generated by a function on input of a number of initial state parameters of said second LFSR-S,
C1) Providing a challenge using said elements of said second LFSR-S,
D1) Providing a proof-of-work by verifying a provided solution by
recomputing a solution to said challenge using initial state parameters and coefficients of said first LFSR-S, and
comparing a provided computed solution with said recomputed solution.

In a further embodiment the present invention provides to a computing device, ' PCD' being adapted to recursively compute all elements of a first LFSR-S by using transmitted elements and coefficients of a second LFSR-S, and to compute a solution for a received challenge based on said computed elements of said first LFSR-S and transmitting said solution to a VCD.

In a further embodiment the present invention provides to a method, performed by a computing device, 'PCD', comprising:
A2) Recursively computing all elements of a first LFSR-S by using provided elements of a second LFSR-S,
B2) Computing a solution for a received challenge based on said computed elements of said first LFSR-S.

In a further embodiment the present invention provides to a non-transitory computer readable medium storing a program causing a computer to execute a process, said process comprising:
A1) Computing a first linear feedback shift register sequence, 'LFSR-S', using a first polynomial having a first degree and computing a second LFSR-S based on a second polynomial, wherein said polynomials are computed such that the first polynomial divides the second polynomial,
B1) Providing elements generated by a function on input of a number of initial state parameters of said second LFSR-S,
C1) Providing a challenge using said elements of said second LFSR-S,
D1) Providing a proof-of-work by verifying a provided solution by
recomputing a solution to said challenge using initial state parameters and coefficients of said first LFSR-S, and
comparing a provided computed solution with said recomputed solution.

In a further embodiment the present invention provides to a non-transitory computer readable medium storing a program causing a computer to execute a process, said process comprising:
A2) Recursively computing all elements of a first LFSR-S by using provided elements of a second LFSR-S,
B2) Computing a solution for a received challenge based on said computed elements of said first LFSR-S.

At least one embodiment of the present invention has the advantage that it can be efficiently realized while being easy to fine-tune.

The terms "VCD" and "PCD" may refer each to a device adapted to perform computing like a personal computer, a tablet, a mobile phone, a server, or the like and comprises one or more processors having one or more cores and is connectable to a memory for storing an application which is adapted to perform at least part of the corresponding steps of one or more of the embodiments of the present invention. Any application may be software-based and/or hardware-based installed in the memory on which the processor(s) can work on.

The term "LFSR" may refer to a linear feedback shift register. A feedback shift register FSR may be defined as follows: F may be some finite field, e.g., $Z_p$ for some prime p. A feedback shift register FSR of length $\lambda$ comprises of an internal state of length $\lambda$ and update function F: $F^\lambda \to F$. Given some initial state $S_0=(S_0[0], \ldots, S_0[\lambda-1]) \in F^\lambda$, the following steps take place at each clock: t:

1. The value $S_t[0]$ is given out and forms a part of the output sequence.
2. The state $S_T \in F^\lambda$ is updated to $S_{t+1}$ where $$S_{t+1} = (S_{t+1}[0], \ldots, S_{t+1}[\lambda-1]) \quad (1)$$

$$= (S_t[1], \ldots, S_t[\lambda-1], F(S_t)). \quad (2)$$

SeqFSR, $S_0$ is denoted as the output sequence of FSR given an initial state $S_0$.

A special class of FSRs are so-called linear feedback shift registers. These are characterized by linear feedback functions F, that is functions of the form $$F(x_1, \ldots, x_\lambda) = c_1 \cdot x_1 + \ldots + c_\lambda \cdot x\lambda \quad (3)$$

LFSRs have to the following advantages:
1. They can be efficiently realized, especially if considering $F=Z_2$ and hardware implementations.
2. They are mathematically well understood. In particular, one knows exactly how to construct LFSRS such that the output sequence has maximum period for any non-zero initial state.

With respect to the latter, a feedback polynomial may be defined as follows. Given an LFSR with feedback function $F(x_1, \ldots, x_\lambda) = c_1 \cdot x_1 + \ldots + c_\lambda \cdot x_\lambda$, the feedback polynomial $p(x) \in F[x]$ is defined as $$p(x) = x^\lambda - \sum_{i=1}^{\lambda} C_i \cdot x^{i-1}. \quad (4)$$

It is known that the LFSR produces a sequence of maximum period $[F]^\lambda - 1$ if and only if $p(x)$ is primitive. Moreover, it holds that any multiple of a feedback polynomial is again a feedback polynomial.

Further features, advantages and further embodiments are described or may become apparent in the following:

Said second polynomial may be computed by said VCD prior to said first polynomial. This provides the advantage that the verifier can control the size of the coefficients of said first polynomial. Thus a higher flexibility when tuning the proof-of-work is enabled.

The lengths of said first and second LFSR-S may be computed by said VCD such that said lengths are identical. This enables an easy implementation without loosing flexibility in fine-tuning.

Said challenge may comprise a computation of a product of two distinct sets, said sets comprising elements of groups of different order and wherein two distinct first and second LFSR-S are computed. This enables to provide a simple challenge which can be computed by the verifier.

Initial state and coefficients of said second LFSR-S may be selected such that said second LFSR-S having a period equal or greater than the period of the first LFSR-S. This enables in an easy way to fine-tune the effort for the verifier and to scale the gap between the efforts of the verifier and the prover.

Said elements of said first LFSR-S may be computed with a common base and exponents, said exponents being initial state parameters of said first LFSR-S. This provides that—when verifying the solution—the verifier has only to perform multiplication and additions while the prover computing the solution has to perform exponentiations and multiplications while simultaneously being able to regressively compute all elements of said first LFSR-S.

A plurality of challenges may be generated and a plurality of solutions may then be computed. Using more than one challenge and correspondingly more than one solution enables batch verifications where solutions to different challenges can be combined such that the correctness of the combined solution can be directly checked without the need to check each solution individually.

FIG. 1 shows a system according to an embodiment of the present invention.

In FIG. 1 the principle setup according to an embodiment of the present invention is shown: A verifier is connected via a network to a prover, wherein the verifier and the prover are both computation devices each comprising a central processing unit CPU and memory.

Figure 2:
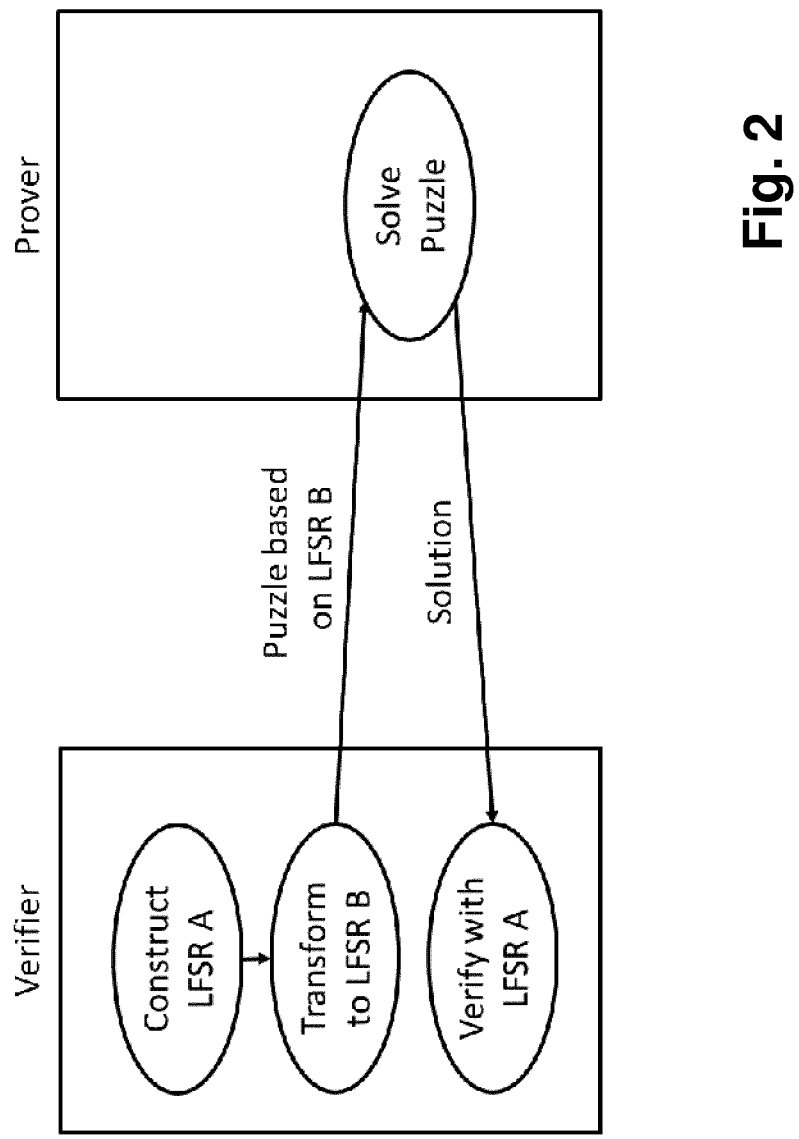
FIG. 2 shows a method according to a further embodiment of the present invention.

FIG. 2 shows a method according to a further embodiment of the present invention.

In FIG. 2 a high level diagram showing a method according to an embodiment is shown.

First a verifier constructs a first LFSR-A. This LFSR-A is then transformed to an LFSR-B. Generators of this LFSR-B and coefficients are then sent as puzzle to the prover.

The prover solves this puzzle, i.e. generates a solution for this puzzle, and provides it back to the verifier. The verifier then verifies the computed solution of the prover by re-computing the solution itself using the LFSR-A.

In greater detail the following steps are performed:
1) Constructing an initial LFSR using polynomial $f_a(x)$ of degree $\lambda$ by the client/verifier.
2) Constructing a new LFSR using polynomial $f_a'(x)$ of degree $\lambda'$ such that $f_a(x)$ divides $f_a'(x)$ by the client/verifier, i.e. a (blinded LFSR)
3) The client/verifier sends a generator g of a multiplicative group of order P along with the polynomial coefficients used as exponents of g. That is, the verifier sends the values $g^{a1} \ldots g_{a\lambda'}$ along with integers to be used as coefficients.
4) The prover/server computes back to back exponentiations by generating new values raised as exponents with base g using the (blinded) LFSR with polynomial $f_a'(x)$
5) The prover/server sends the puzzle solution to the verifier.
6) The client/verifier can easily verify the puzzle solution using the small LFSR and by leveraging his knowledge of the group order.

In even greater detail the method is described in the following:

At the beginning, the verifier generates an RSA modulus N:=p·q, where p and q are two safe primes whose size is chosen according to the security parameter. Safe primes means that p−1=2·p' and likewise q−1=2·q' so that p' and q' are again primes.

Unless specified otherwise, all operations are performed in the multiplicative group $Z^*_N$ of invertible integers modulo N. Moreover, the protocol derives a time threshold $\Theta$ which also depends on the security parameter.

Assuming that the verifier is interested in maintaining t replicas in addition to the original file D at the cloud, the verifier additionally constructs copy parameters H that are provided to the prover as well. To this end, the verifier first generates two elements g, h∈$Z^*_N$ of order p' and q', respectively, wherein the order of $Z^*_N$ is $$\phi(N)=(p-1)(q-1)=4 \cdot p' \cdot q'.$$

The elements g and h will be made public to the prover while their orders are kept secret.

The overview of the idea is as follows: A sequence of values $a_1, a_2, \ldots \in Z_{p'}$ is considered. Based on this sequence, a sequence of elements $g_1, g_2, \ldots$ in $Z_N$ is defined as follows:

$$g_i := g^{a_i}$$

The order of g is p' by construction and the elements $a_i$ are taken from $Z_{p'}$. Likewise values $h_j$ are defined by $h_j := h^{b_j}$ for a sequence $b_1, b_2, \ldots \in Z_{q'}$. Finally, a set I of positive integers is defined, the value $g_I$ as $$g_I := \prod_{i \in I} g_i$$

and likewise $h_J$ for a set J.

Now a challenge is: given two sets I and J, compute $g_I \cdot h_J$. The idea here is that the prover is only given some elements $g_i$ and $h_j$ which allows computing the solutions with a certain effort while the verifier knows additional secret parameters that allow for computing the response significantly faster.

In the following it is explained how the sequences $(a_t)_{t \geq 1}$ and $(b_t)_{t \geq 1}$ are constructed. Different approaches are possible, it is important that they can be efficiently constructed by the verifier while the effort is higher for the prover. The idea here is that $(a_t)_{t \geq 1}$ and $(b_t)_{t \geq 1}$ are sequences generated by linear feedback shift registers (LFSRs). As explained above, a LFSR sequence $(s_t)_{t \geq 1}$ over some finite field F is determined by an initial state $(s_1, \ldots, s_\lambda) \in F^\lambda$ and feedback coefficients $(c_1, \ldots, c_\lambda) \in F$. The elements $s_{t+\lambda+1}$ with $t \geq 0$ are defined by $$s_{t+\lambda+1} := \sum_{i=1}^{\lambda} c_i \cdot s_{t+i}.$$

Here, $\lambda$ is the length of the LFSR. In particular one knows how to choose coefficients such that the period of the sequence is $|F|^\lambda - 1$, being the maximum possible period.

In the following, $\lambda$ denotes a positive integer. To generate the two LFSR sequences, the verifier has to generate two initials states and two sets of coefficients. However an option is provided that allows for increasing the gap between the effort of the verifier and the prover. In a nutshell, the prover will receive information to produce the LFSR sequences but based on longer initial states.

More precisely, for the sequence $(a_t)_{t \geq 1}$, the verifier chooses $\lambda$ random elements $a_1, \ldots, a_\lambda \in Z_{p'}$, being the initial state, and coefficients $\alpha_1, \ldots, \alpha_\lambda \in Z_{p'}$, such that the resulting sequence has a significantly large period. The verifier now generates information that allow the verifier to generate the sequence of elements $(g^{a_t})_{t \geq 1}$.

To increase the effort on the prover side, the verifier proceeds as follows:
1. Choose a multiple of $f_a(x)$, that is a polynomial $f^*_a(x) \in Z_{p'}[x]$ such that $f_a(x)$ divides $f^*_a(x)$. One knows from the theory about LFSRs that $f^*_a(x)$ is likewise a feedback polynomial of the sequence $(a_t)$. That is assume that $f^*_a(x) = x^{\lambda^*} - \Sigma^{\lambda^*}_{i=1} \alpha'_i x^{i-1} \in Z_{p'}[x]$. Then it holds $$a_{t+\lambda^*+1} = \sum_{i=1}^{\lambda^*} \alpha'_i \cdot a_{t+i}$$

for all $t \geq 0$.

2. Next, the verifier chooses some integers $\alpha^*_1, \ldots, \alpha^*_{\lambda^*}$ such that $\alpha^*_i \mod p' = \alpha'_i$ for $i = 1, \ldots, \lambda^*$.

Then, the verifier publishes as part of the copy parameters the values $g^{\alpha_1}, \ldots, g^{\alpha_{\lambda^*}} \in Z_N$ and the coefficients $\alpha^*_1, \ldots, \alpha^*_{\lambda^*} \in Z$.

With respect to sequence $(b_t)$, the verifier proceeds exactly in the same way. The main difference is that the values $(b_t)$ and the coefficients $(\beta_i)$ are taken from $Z_{q'}$. Different lengths $\lambda$ and $\lambda^*$ may be chosen here, but in the following same lengths $\lambda = \lambda^*$ are assumed.

Summing up, the verifier sets the file specific verification tag to $$I := (p, q, (a_1, \ldots, a_\lambda), (\alpha_1, \ldots, \alpha_\lambda), (b_1, \ldots, b_\lambda), (\beta_1, \ldots, \beta_\lambda)).$$

These values are kept secret.

To enable the prover to solve challenges, the following parameters are given:

$$\Pi := ((g^{\alpha_1}, \ldots, g^{\alpha_{\lambda^*}}), (\alpha_1^*, \ldots, \alpha_{\lambda^*}^*), (h^{b_1}, \ldots, h^{b_{\lambda^*}}), (\beta_1^*, \ldots, \beta_{\lambda^*}^*))$$

In the description given above, the secret feedback polynomial $f_a(x)$ is chosen first and then $f^*_a$ is determined as a multiple of $f_a(x)$. One drawback of that is that the verifier has no control about the size of the coefficients $\alpha'_i$ (which in turn impacts the size of $\alpha^*_i$). This may impose a minimum effort on the prover that may be greater than envisioned by the verifier.

To overcome this issue, one can also proceed the other way around. That is the verifier first chooses $f^*_a$ where he controls the size of the coefficients. Afterwards he factorizes $f^*_a$ and picks one factor $f_a$ for the secret feedback polynomial. In the case of need, this has to be repeated until a suitable factor is found.

In the following, it is explained how the prover can compute values $g_t$ for $t > \lambda^*$ given $\Pi$. This is accomplished with the following recursive relation which holds for any $t > 0$:

$$g_{t+\lambda^*} := g_t^{\alpha_1^*} \cdot \ldots \cdot g_{t+\lambda^*-1}^{\alpha_{\lambda^*}^*}$$

That is the prover can compute any $g_t$ by applying this formula recursively. The correctness of this procedure is shown in the following:

For $t = 1, \ldots, \lambda^*$, this holds by definition. Assume now that $g_t = g^{a_t}, \ldots, g_{t+\lambda^*-1} = g^{a_{t+\lambda^*-1}}$ for some $t \geq 1$. Then it holds for $g_{t+\lambda^*}$:

$$g_{t+\lambda^*} := g_t^{\alpha_1^*} \cdot \ldots \cdot g_{t+\lambda^*-1}^{\alpha_{\lambda^*}^*}$$

$$\stackrel{Ind.}{=} (g^{a_t})^{\alpha_1^*} \cdot \ldots \cdot (g^{a_{t+\lambda^*-1}})^{\alpha_{\lambda^*}^*}$$

$$\stackrel{ord(g)=p'}{=} (g^{a_t})^{\alpha'_1} \cdot \ldots \cdot (g^{a_{t+\lambda^*-1}})^{\alpha'_{\lambda^*}}$$

$$= g^{\Sigma_{i=1}^{\lambda^*} \alpha'_i \cdot a_{t+i}}$$

$$\stackrel{Eq.(8)}{=} g^{a_{t+\lambda^*}}.$$

That is the prover can compute the values $g^{a_t}$ for any $t \geq 1$ but without knowing the values $a_t$. Analogously, the prover can compute the values ht, using the given starting values and the coefficients $\beta^*_i$.

Given a challenge (I,J), a solution can be computed by deriving $g_i$ for each $i \in I$ and likewise $h_j$ for each $j \in J$ and eventually multiplying these.

In principle, the verifier checks a solution by computing it by himself and comparing the results. However, to this end he benefits from the additional secret information stored in τ. For simplicity, here only the computation of $g_I$ is addressed as the case of $h_J$ is straightforward:

$$g_I = \prod_{i \in I} g_i = \prod_{i \in I} g^{a_i} = g^{\Sigma_{i \in I} a_i}.$$

Thus, if the verifier can efficiently compute $\Sigma_{i \in I} a_i \in Z_p$, verification can be achieved by (i) computing the exponent, (ii) raising g to this exponent, and (iii) comparing the result with the given solution. The sequence $(a_t)_{t \geq 1}$ is an LFSR-sequence being generated by the feedback polynomial of degree λ. This allows for computing the values $a_t$ directly from the initial values $a_1, \ldots, a_\lambda$ and this requires only multiplication and additions over $Z_p$, while the prover has to perform exponentiations and multiplications over $Z_N$.

Moreover, the verifier needs to know λ successive values only while the prover has to use $\lambda^* > \lambda$ many values. As these values can be scaled almost freely (and likewise the coefficients used by the prover) allows to (i) adapt the effort for the verifier and
(ii) scale the gap between the efforts of the verifier and the prover.

In addition, one may exploit the fact that the element $a_i$ are computed by a linear feedback function. This means that there exists a matrix M of size λ×λ with coefficients in $Z_p$, such that $$M \times A_t = A_{t+1}.$$

where $A_t = (a_t, \ldots, a_{t+\lambda-1})$.

Due to the linearity of the operations, it suffices to compute $$\sum_{i \in I} M^i \cdot A_I$$

and to take the first entry of the resulting vector. To this end, one could consider to precompute the matrices $M^{2j}$ for sufficient j and to construct the matrices $M^i$ by using square-and-multiply.

What about a possibly malicious prover who aims to reconstruct a replica instead of storing it permanently. Obviously, this requires to reconstruct the needed values $g_i$ and likewise $h_j$. Compared to the verifier, he cannot use some of the tricks explained above:

1. As the prover can never predict whether the verifier will check the response with respect to g or h (or may be in some cases both), he is forced to recompute both—the powers of g and the powers of h.
2. Due to the fact that the prover does not know the true length λ of the LFSR but only the first $\lambda^*$ of the sequence, he has to deal with an LFSR of length $\lambda^* \geq \lambda$. This induces more effort.
3. To apply the square-and-multiply technique, the prover would have to precompute and store matrices of size $\lambda^* \times \lambda^*$ instead of size λ×λ. Another disadvantage is that these matrices are over Z while the verifier considers matrices over $Z_p$. The latter means that the size of entries is restricted while the size of entries of the matrices of the prover can grow without any limit.

Thus, by tuning the length $\lambda^*$ (in comparison to λ) and by choosing the bit-sizes of the coefficients $\alpha^*_i$ and $\beta^*_i$, one has two types of parameters that allow for increasing the effort on the prover side without affecting the effort of the verifier.

Embodiments of the present invention leverage LFSR-S to construct a puzzle where the server solving time and the client verification time can be independently and easily adjusted. Further Embodiments of the present invention provide LFSR-S being combined with modular exponentiation-based puzzles to construct a new hybrid puzzle. The term "hybrid" refers to a puzzle which is both computational and memory-bound. The amount of memory and computations required by said puzzle can be easily fine-tuned.

Embodiments of the present invention have the advantage that the construction of a hybrid puzzle combining the benefits of both computational memory-bound puzzles is enabled in which the difficulty of both solving it and verifying it can be easily adjusted depending on the requirements of the deployment setting. Further embodiments of the present invention enable or support batch verification or solution to different challenges can be combined such that the correctness of the combined solution can be directly checked without the need to check each solution individually.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for providing a proof-of-work, the method comprising:
   a) computing, by a verification computing device (VCD), a first linear feedback shift register sequence (LFSR-S) using a first polynomial having a first degree and computing, by the VCD, a second LFSR-S based on a second polynomial, wherein the polynomials are computed such that the first polynomial divides the second polynomial,
   b.1) generating, by the VCD, elements of the second LFSR-S based on initial state parameters and corresponding coefficients of the second LFSR-S, wherein the initial state parameters and corresponding coefficients, in conjunction, at least partially determine the second LFSR-S,
   b.2) transmitting, by the VCD, the elements and the corresponding coefficients of the second LFSR-S to a proving computing device (PCD),
   c) transmitting a challenge, generated by the VCD using the elements of the second LFSR-S, to the PCD,
   d) recursively computing, by the PCD, all elements of the first LFSR-S by using the transmitted elements and coefficients of the second LFSR-S,
   e) computing a solution for the received challenge based on the computed elements of the first LFSR-S and transmitting the solution to the VCD, and
   f) providing a proof-of-work by verifying, by the VCD, the transmitted solution by:
      recomputing a solution to the challenge using initial state parameters and coefficients of the first LFSR-S, and
      comparing the computed solution of the PCD with the recomputed solution of the VCD.

2. The method according to claim 1, wherein the second polynomial is computed by the VCD prior to the first polynomial.

3. The method according to claim 1, wherein the lengths of the first and second LFSR-S are computed by the VCD such that the lengths are identical.

4. The method according to claim 1, wherein the challenge comprises a computation of a product of a first set and a distinct second sets.

5. The method according to claim 1, wherein initial state and coefficients of the second LSFR-S are selected such that the second LSFR-S has a period equal or greater than the period of the first LSFR-S.

6. The method according to claim 1, wherein the elements of the first LSFR-S are computed with a common base and exponents, the exponents being initial state parameters of the first LSFR-S.

7. The method according to claim 1, wherein a plurality of challenges is generated and a plurality of solutions is computed.

8. A system for providing a proof-of-work, comprising a verification computing device (VCD) and a proving computing device (PCD),
   the VCD being adapted to:
      compute a first linear feedback shift register sequence (LFSR-S) using a first polynomial having a first degree and computing, a second LFSR-S based on a second polynomial, wherein the polynomials are computed such that the first polynomial divides the second polynomial,
      generate elements of the second LFSR-S based on initial state parameters and corresponding coefficients of the second LFSR-S, wherein the initial state parameters and corresponding coefficients, in conjunction, at least partially determine the second LFSR-S,
      transmit the elements of the second LFSR-S to the PCD,
      transmit a challenge, generated by the VCD using the elements of the second LFSR-S, to the PCD, and
      provide a proof-of-work by verifying, a transmitted solution by:
         recomputing a solution to the challenge using initial state parameters and coefficients of the first LFSR-S, and
         comparing a computed solution of the PCD with the recomputed solution, and
   the PCD being adapted to:
      recursively compute all elements of the first LFSR-S by using the transmitted elements of the second LFSR-S, and
      compute a solution for the received challenge based on the computed elements of the first LFSR-S and transmitting the solution to the VCD.

9. A non-transitory computer readable medium storing a program causing a computer to execute a method for providing a proof-of-work, the method comprising:
   a) computing a first linear feedback shift register sequence (LFSR-S) using a first polynomial having a first degree and computing a second LFSR-S based on a second polynomial, wherein the polynomials are computed such that the first polynomial divides the second polynomial,
   b.1) generating elements of the second LFSR-S based on initial state parameters and corresponding coefficients of the second LFSR-S, wherein the initial state parameters and corresponding coefficients, in conjunction, at least partially determine the second LFSR-S,
   b.2) providing, to a proving computing device (PCD), the elements of the second LFSR-S,
   c) providing, to the PCD, a challenge using the elements of the second LFSR-S,
   d) recursively computing all elements of the first LFSR-S by using the provided elements of the second LFSR-S,
   e) computing a solution for the received challenge based on the computed elements of the first LFSR-S, and
   f) generating a proof-of-work by verifying the solution by:
      recomputing a solution to the challenge using initial state parameters and coefficients of the first LFSR-S, and
      comparing the computed solution with the recomputed solution.

10. A verification computing device (VCD) comprising one or more hardware processors adapted to:
    compute a first linear feedback shift register sequence (LFSR-S) using a first polynomial having a first degree and computing a second LFSR-S based on a second polynomial, wherein the polynomials are computed such that the first polynomial divides the second polynomial,
    generate elements of the second LFSR-S based on initial state parameters and corresponding coefficients of the initial state parameters, wherein the initial state parameters and corresponding coefficients, in conjunction, at least partially determine the second LFSR-S,
    transmit the elements of the second LFSR-S to a proving computing device (PCD),
    transmit a challenge, generated by the VCD using the elements of the second LFSR-S, to the PCD, and generate a proof-of-work by verifying a received solution by:
  recomputing a solution to the challenge using initial state parameters and coefficients of the first LFSR-S, and
  comparing a computed solution of the PCD with the recomputed solution of the VCD.

11. A method, performed by a verification computing device (VCD), comprising:
A1) computing a first linear feedback shift register sequence (LFSR-S) using a first polynomial having a first degree and computing a second LFSR-S based on a second polynomial, wherein the polynomials are computed such that the first polynomial divides the second polynomial,
A2) generating elements of the second LFSR-S based on initial state parameters of the second LFSR-S, wherein the initial state parameters at least partially determine the second LFSR-S,
B1) providing the elements of the second LFSR-S to a proving computing device (PCD),
C1) providing a challenge to the PCD, wherein the challenge is generated using the elements of the second LFSR-S, and
D1) generating a proof-of-work by verifying a received solution by:
  recomputing a solution to the challenge using initial state parameters and coefficients of the first LFSR-S, and
  comparing the received solution with the recomputed solution.

12. A non-transitory computer readable medium storing a program causing a computer to execute a process, the process comprising:
A1) computing a first linear feedback shift register sequence (LFSR-S) using a first polynomial having a first degree and computing a second LFSR-S based on a second polynomial, wherein the polynomials are computed such that the first polynomial divides the second polynomial,
A2) generating elements of the second LFSR-S based on initial state parameters of the second LFSR-S, wherein the initial state parameters at least partially determine the second LFSR-S,
B1) providing, to a proving computing device (PCD), elements generated by a function on input of a number of initial state parameters of the second LFSR-S,
C1) providing, to the PCD, a challenge that is based on the elements of the second LFSR-S, and
D1) generating a proof-of-work by verifying a received solution by:
  recomputing a solution to the challenge using initial state parameters and coefficients of the first LFSR-S, and
  comparing the received solution with the recomputed solution.

13. The method of claim 1, wherein the second LFSR-S is over a finite field F, the initial state parameters $(s_1, \ldots, s_\lambda)$ are structured such that $(s_1, \ldots, s_\lambda) \in F^\lambda$, and the coefficients $(c_1, \ldots, c_\lambda)$ are structured such that $(c_1, \ldots, c_\lambda) \in F$, wherein $\lambda$ is a positive integer length of the second LFSR-S.

14. The method of claim 13, wherein the elements of the second LFSR-S are expressed as $s_{t+\lambda+1}$ and defined according to the following formula in which $t \geq 0$:

$$s_{t+\lambda+1} := \sum_{i=1}^{\lambda} c_i * s_{t+i}.$$

15. A verification computing device comprising one or more hardware processors, which alone or in combination, are configured to perform the method of 11.

* * * * *